United States Patent [19]

Canellis et al.

[11] 4,310,271
[45] Jan. 12, 1982

[54] DISPOSABLE DUNNAGE SYSTEM FOR TRANSPORTING VEHICLES

[76] Inventors: Peter Canellis, 12 Hillburn Rd., Scarsdale, N.Y. 10583; Thomas H. Mock, 1627 Colonial Blvd., NE., Canton, Ohio 44714

[21] Appl. No.: 150,972

[22] Filed: May 19, 1980

[51] Int. Cl.³ .............................. B60P 3/07; B60P 7/08
[52] U.S. Cl. ........................................ 410/13; 52/90; 52/639; 254/88; 410/23; 410/24; 410/30; 410/119; 428/178
[58] Field of Search ...................... 410/3, 4, 7, 13, 16, 410/19, 23, 24, 30, 119; 428/178; 14/71.1; 254/88; 52/90, 639, 642; 220/1.5

[56] References Cited
U.S. PATENT DOCUMENTS

| 1,856,106 | 5/1932 | McMulley | 410/13 |
| 3,305,114 | 2/1967 | Bellingher | 410/13 X |
| 3,906,571 | 9/1975 | Zetlin | 428/178 X |
| 4,122,639 | 10/1978 | Barrell | 52/90 |

FOREIGN PATENT DOCUMENTS 1079405 11/1954 France ................................ 52/639

OTHER PUBLICATIONS

Brochure—St. Regis Company—Triplewall Corrugated Board.

Primary Examiner—Randolph A. Reese
Attorney, Agent, or Firm—Brumbaugh, Graves, Donohue & Raymond

[57] ABSTRACT

A container transport system for carrying a plurality of vehicles includes a cargo container and at least one ramp within the container. The ramp is disposable and is made of corrugated cardboard. In forming the ramp a plurality of load cells of increasing average height are positioned next to each other and are covered by a cardboard envelope. The cells are formed by folding cardboard panels into a trapezoidal shape.

11 Claims, 3 Drawing Figures

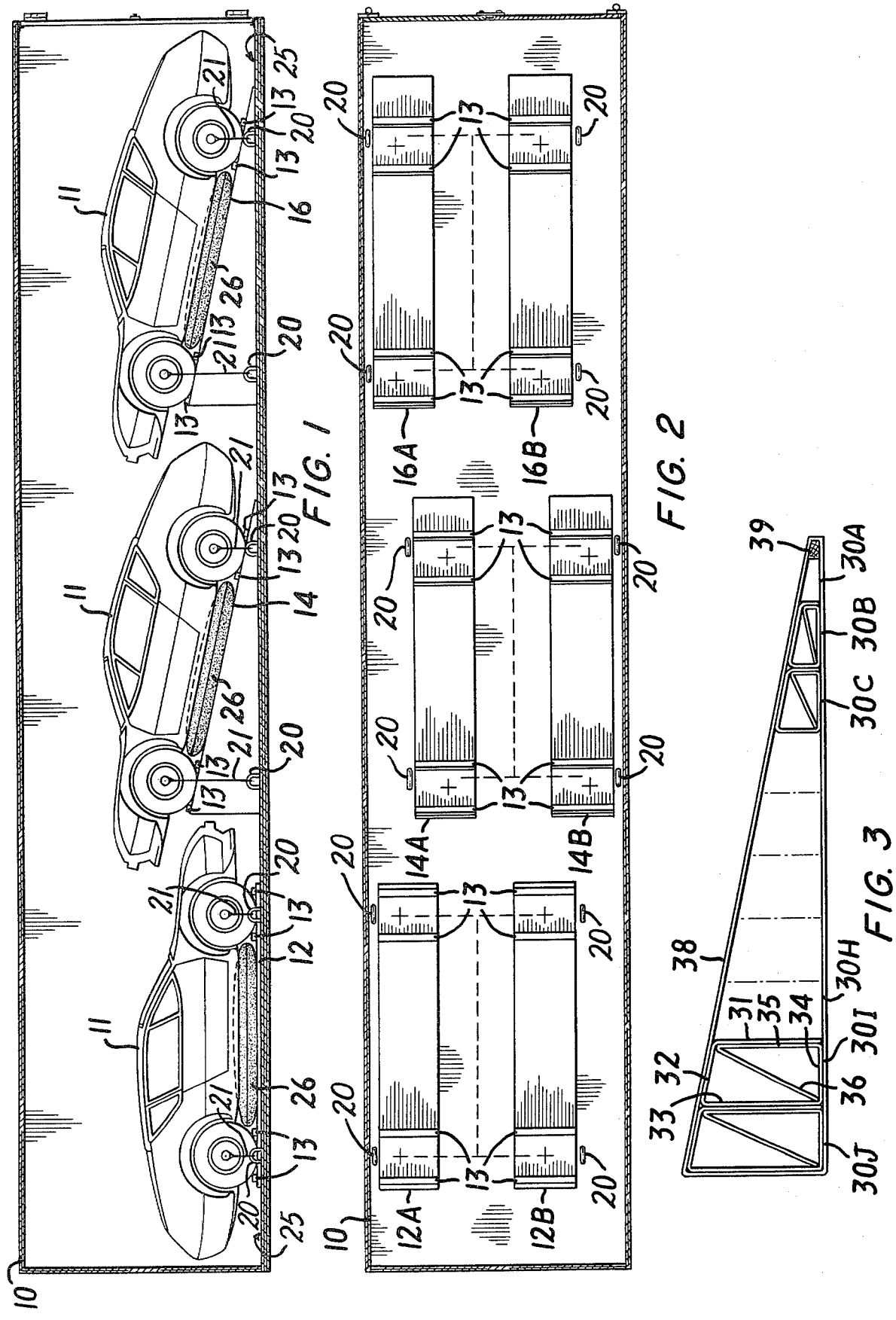

DISPOSABLE DUNNAGE SYSTEM FOR TRANSPORTING VEHICLES

BACKGROUND OF THE INVENTION

1. Field of the Invention

The present invention relates to a dunnage system for transporting vehicles in containers and, more particularly, to a dunnage system of this type which affords the advantages of compact storage of vehicles.

2. The Prior Art

In recent years, cargo containers have come into prominence as a means for shipping various types of goods. These containers can be loaded at the manufacturer and shipped across the world without the necessity of handling the individual products. Various rail and dock facilities have been especially designed to accommodate these prepacked containers in an efficient and cost effective way.

Basically the cost of transporting a container does not vary to any great extent based on its contents. Thus, the transportation cost on a per item basis can be reduced if more products are included in each container. With respect to vehicles, it has been found that the standard container can conveniently handle only two automobiles placed end-to-end within it. In order to increase the capacity of these containers, steel ramps, like those used on over-the-road car carriers, have been positioned within the containers so as to tilt the two cars to a sufficient extent to make room for a third car. At least one end ramp must be removed from the container so that a car can be placed on the ramp in the middle of the container. Also, it is advantageous if the ramps are removable so that they can be shipped back to the automobile manufacturer for reuse, thus eliminating the need to dedicate a container to use with automobiles.

The steel ramps known in the industry have several major drawbacks. They require a relatively large initial capital investment, and maintenance and repair of these ramps is also expensive. Further, damage claims arise when the cars contact and are damaged by the steel members of the ramp during the loading and carrying of the vehicles. Logistic problems are also associated with the reclamation of the ramps from the containers and their transport back to the shipper or manufacturer of the automobile for reuse.

SUMMARY OF THE INVENTION

The present invention overcomes these and other disadvantages of the prior art by providing a dunnage system for use in vehicle transport containers which retains the full transport capacity of prior heavy steel systems while eliminating the drawbacks associated therewith. This object is attained by forming the ramps and appurtenant structures for supporting the vehicles of inexpensive, and thus disposable, cardboard arranged in a unique manner that permits it to support the weight of the vehicle and to be quickly installed in place within a standard container. The dunnage system of the invention, therefore, requires no capital investment or maintenance costs, will not damage the vehicle during transport, and does not need to be returned to the shipper or manufacturer for reuse.

In an illustrative emodiment of the invention the ramps are made from a plurality of load cells of increasing average height, which are positioned next to each other. Each cell is formed from a single cardboard panel that is folded and fastened into a particular trapezoidal shape having a base, two parallel sides of different height, a top inclined between the parallel sides, and a diagonal piece between the top of the longer side and the bottom of the shorter side. The longer side is also formed with a double thickness of cardboard. In order to create a ramp effect, the difference in height of the parallel sides for each ramp is substantially the same and the overall height of the sides of each cell is such that they match that of the sides of neighboring adjacent cells. A cardboard envelope is fixed about the plurality of cells to complete the ramp.

If desired, chocks, in the form of cardboard strips, can be positioned across the ramp to limit vehicle movement. Conventional dunnage bags and anchoring cables can be used in the container to further restrain movement of the vehicles during transport.

BRIEF DESCRIPTION OF THE DRAWINGS

The foregoing and other features of the present invention will be more readily apparent from the following detailed description and drawings of an illustrative embodiment of the invention in which:

FIG. 1 is a side view of a container loaded with automobiles according to the present invention, with its side wall removed;

FIG. 2 is a top view of the container of FIG. 1 with its top wall and the automobiles removed; and FIG. 3 is a side view of a typical ramp according to the present invention.

DESCRIPTION OF AN ILLUSTRATIVE EMBODIMENT

As can be seen from FIG. 1, a typical cargo container 10 is not capable of handling more than two cars 11 if they are placed flat in the container end-to-end. This situation can be improved as shown by placing two of the cars on ramps 14, 16 so that they overlap to a certain extent and leave room for a third car positioned on platform 12. The car on ramp 14 is overlapped by the car on ramp 16 and itself overlaps the car on the platform 12.

According to the present invention the ramps and platform are formed of cardboard, preferably St. Regis "triplewall corrugated board", and are disposable after use. As a result, the ramps and platforms are not expensive and require no capital investment. Since they are disposable, there is no repair and maintenance cost associated with them and there are no logical problems involved in sending them back to the manufacturer or shipping company for reuse. Because these ramps and platforms are made of cardboard, they cannot damage the vehicle and claims against the shipper are reduced.

In order to assure a stable support of the vehicles, each is placed on pairs of platforms 12A, 12B or ramps 14A, 14B and 16A, 16B spaced as shown in FIG. 2. A light weight cardboard flooring 25, as opposed to "triplewall" is nailed to the floor of the container so that the ramps and platforms can be bonded to it rather than the wooden floor of the container. This flooring 25 can be premarked to identify the correct positions of the platform and ramps for ease of assembly. The platforms 12 for the leftmost car in FIG. 1 are merely flat strips of cardboard glued or nailed to the floor of the container. The car is driven onto the platforms and its wheels are blocked by laminated cardboard chocks 13 which are stapled or glued onto the platform. In order to assure that the car does not move during transport, its under carriage is connected to lashing cables 21, which in turn are fastened to "D"-ring anchors 20 on the floor of the container. The cables are then tightened by hand tension to remove slack.

The center car is positioned on ramp 14 in the container before the ramp 16 is installed, so it can be driven into the right side of the container (as shown in FIG. 1) and up ramp 14, after which it is secured in place with chocks and an anchor cable system 20–21 in the same manner as the car on platform 12. Next, ramp 16 is installed and the rightmost car in FIG. 1 is driven onto it and anchored in place.

As shown in FIG. 3, each ramp is made from a plurality of load cells 30A–30J having a trapezoidal shape and an increasing average height, respectively, which cells are positioned next to each other. The load cells are created by folding and glueing, stapling or otherwise fastening a single strip of cardboard into the appropriate trapezoidal shape. The shape, as shown in FIG. 3 with respect to cell 30I, has a base 34, two parallel sides 33, 35 of different height, an inclined top 32 extending between the parallel sides, and a diagonal piece 36. At least one of the parallel sides, e.g. side 35, is reinforced with an additional thickness of cardboard 31.

To aid in shipping the ramp parts to the user and folding them into shape, the cardboard is supplied in flat pre-cut sheets with score lines at the appropriate fold points.

In forming a typical cell, such as cell 30I, the reinforcing side 31 is first created by folding the cardboard strip such that it has a length slightly greater than the side wall of the adjacent load cell 30H. The top 32 is created in the cardboard section between the first fold and a second fold spaced sufficiently to allow the top section 32 to extend over the projected base region at an incline between the side walls of the neighboring cells 30J and 30H. A fold for the longer side wall 33 is made at a distance corresponding to the length of the adjacent side wall of cell 30J. The next fold establishes the base section 34 and leads to the section for the shorter side 35, which is equivalent in length to the adjacent side wall of cell 30H. Finally, the fold for the diagonal 36 is made so that it extends from the top of side wall 35 to the bottom of side wall 33. If desired, the cell can be formed with the reinforcing wall on the longer of the two parallel sides, i.e. along side 33. In such a case the same folding pattern would be followed, except that side 35 and reinforcing wall 31 would be made longer than side 33.

Once the cardboard has been bent into shape it is glued, stapled or otherwise secured in that shape. Then the cells are positioned next to each other, arranged according to height, and are surrounded and secured together into a ramp by an envelope 38 of cardboard. At the small end of the ramp a small wooden piece 39 is positioned within the ramp to absorb the impact and prevent local crushing when the car is first driven against and up onto the ramp.

A convenient ramp for use in transporting automobiles has a slope of 22½° and is formed from 10 load cells and an end piece. Each cell has a base of about 2 feet × 2 feet and the longest side wall of the tallest cell is 2 feet, 3 inches. The width of the envelope corresponds to the width of the base and is about 2 feet.

From FIG. 2 it can be seen that the platform 12 and the ramps 14, 16 are alternatively offset to one side of the container or the other, thus providing access space in the container for fastening the ramps and platforms to the container floor by nailing or otherwise, and for securing the cars in place with the chocks 13 and the cable anchor assembly 20–21. During shipment of the container, the vehicles are further protected by conventional inflatable dunnage bags 26 located in the access spaces, under the vehicles, or between them. These bags are paper-polyethylene low pressure bags that are also disposable.

Upon arriving at the destination, the dunnage bags are removed and the anchor cables for the two end cars are released. If desired, the chocks can be stripped from the platform 12 and the ramp 16 before the end cars are removed, or the cars may simply be driven over the chocks. Once the car on ramp 16 is removed, that ramp is torn up from the floor of the container and disposed of. This allows the middle car to be driven from the container once it is released from its anchorage. After the cars are removed, ramp 14 and platform 12 are also pulled from the container floor and disposed. The container is now free to be loaded with any type of goods desired by the shipper. Naturally, if cars are to be shipped in the container again the platform 12 and ramp 14 can be left in place and reused, provided they have not been damaged in transit.

While the present invention has been particularly shown and described with reference to a preferred embodiment thereof, it will be understood by those skilled in the art that various changes in form and details may be made therein without departing from the spirit and scope of the invention. In particular, the load cells can be formed from pre-cut strips of cardboard as opposed to a single folded sheet.

We claim:

1. In a container transport system, for carrying a plurality of vehicles, including a cargo container and at least one ramp located within the container for compactly positioning the vehicles within the container, the improvement characterized by the formation of said at least one ramp from corrugated cardboard, said ramp comprising:

a plurality of load cells of increasing average height which are positioned next to each other, each cell being formed from cardboard panels arranged in a trapezoidal shape having a base, two parallel sides of different height, a top that is inclined between the parallel sides to such an extent as to meet the neighboring edges of the tops of the adjacent cells, and a diagonal piece, at least one of the two parallel sides being reinforced by a second cardboard wall; and an envelope formed of cardboard and extending around the plurality of cells.

2. A transport system as claimed in claim 1 wherein each load cell is formed from a single cardboard panel folded into the trapezoidal shape.

3. A transport system as claimed in claim 2 further including two flat cardboard platforms and wherein the plurality of vehicles is three automobiles and there are four ramps, one of said automobiles being positioned on the two flat cardboard platforms and the other two of said automobiles being positioned on respective pairs of said four ramps.

4. A transport system as claimed in claims 1, 2 or 3 further including chocks formed of laminated cardboard and positioned on the ramp and platform for securing the wheels of the vehicle.

5. A transport system as claimed in claims 1 or 2 further including an anchorage system comprising a D-ring anchored to the floor of the container and cables extending from D-rings to the front and back undercarriage of a vehicle.

6. A transport system as claimed in claims 1 or 2 further including inflatable dunnage bags positioned in the container about the vehicles.

7. A transport system as claimed in claims 1 or 2 further including a wooden end piece positioned within the envelope at the lowermost side of the ramp.

8. A load-bearing ramp formed of corrugated cardboard and comprising:
   a plurality of load cells of increasing average height positioned next to each other, each cell being formed of cardboard in a trapezoidal shape with a base section, two parallel side sections of different height, a top section that is inclined between the upper ends of the parallel side sections and a diagonal section, one of said side wall sections having a reinforcing wall section adjacent it, the lengths of the parallel sides of each cell being substantially the same as the adjacent sides of the neighboring cells, a suitable number of said load cells with inclined top sections being provided to create a ramp from one particular height to another, and
   an envelope formed of cardboard and extending around the plurality of cells.

9. A load-bearing ramp as claimed in claims 1, 2, or 8 wherein said cardboard is triplewall corrugated cardboard.

10. A load-bearing ramp as claimed in claim 8 wherein said ramp further includes chocks formed of laminated cardboard and positioned on the ramp for securing the wheels of the vehicle.

11. A load-bearing ramp as claimed in claim 8 further including a wooden end piece positioned within the envelope at the lower most side of the ramp.

* * * * *